United States Patent Office 3,202,903
Patented Aug. 24, 1965

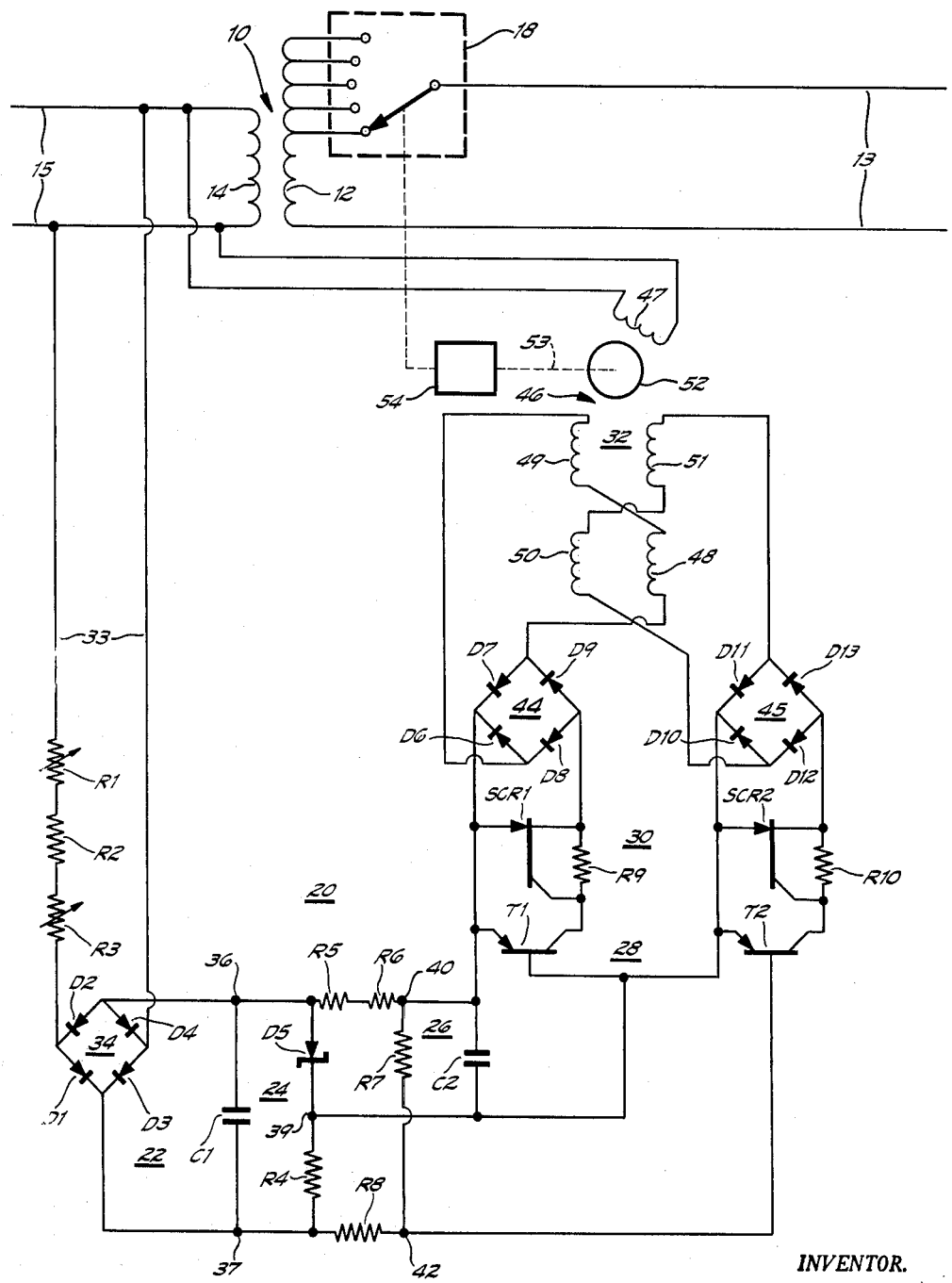

3,202,903
TAP CHANGING VOLTAGE REGULATOR
Richard E. Riebs, Hales Corners, Wis., assignor to McGraw-Edison Company, Milwaukee, Wis., a corporation of Delaware
Filed Nov. 1, 1961, Ser. No. 149,422
4 Claims. (Cl. 323—43.5)

This invention relates to an electrical control circuit having particular, but not exclusive, application to the control of a transformer tap changing apparatus.

In electric power and distribution systems, voltage regulating devices are often used to regulate the input voltage to the system in such a manner that the voltage at the load will be maintained at an economical and effective value relative to the ratings of the load devices. This is necessary because in such systems, the power factor and magnitude of the load impedances are constantly changing as customers intermittently operate various electrical equipment. As a result of such variations, the voltage loss in the source itself and in the distribution circuits connecting the source to the load will also vary necessitating compensating changes in the source voltage.

For this reason, such systems are often provided with voltage regulating devices which sense load voltage and which are operable to change the source voltage in accordance with load voltage changes. One type of control circuit for such voltage regulating devices, such as that shown in copending application Serial No. 816,622, filed May 28, 1959, now Patent No. 3,106,675 granted October 8, 1963, employs output transistors for initiating the operation of a tap changing motor. Such output transistors do not provide precise band width definition and require complicated circuitry to allow operation at elevated temperatures.

It is an object of the invention to provide a voltage regulating control circuit having simplified output circuitry which provides precise band width definition and allows operation at elevated temperatures.

These and other objects and advantages of the invention will become more apparent in the detailed description of the invention taken with the accompanying drawing which shows a preferred embodiment from the instant invention.

In general terms, the invention comprises a device for controlling an electrical quantity in a system and includes circuit means connected to the system for producing an electric current when the quantity being controlled varies from a predetermined range of values, a silicon controlled rectifier having its gate electrode connected to the circuit means and output means for restoring the quantity to said range of values. The anode and cathode of the silicon controlled rectifier normally open circuit the output means whereby the circuit to the output means will be completed when current flows to the gate electrode of said silicon controlled rectifier.

Referring to the drawing in greater detail, a transformer is indicated generally by the reference number 10 and is provided with a primary winding 12 connected to a power line 13 and a secondary winding 14 connected to a load line 15. A suitable snap-acting tap-changing device indicated generally by the reference number 18 is shown connected to the primary side of transformer 10, although it could be connected to the secondary side as well, if so desired. The tap changer 18 is merely schematically illustrated since the details thereof form no part of the instant invention, it being understood that any suitable well known tap changer may be employed.

The tap changer control circuit 20 includes an input circuit 22 which couples the control circuit to the load 15 and which performs the function of protecting the circuit against voltage surges and rendering it insensitive to harmonics and the like. In addition, the circuit 20 also includes a first circuit portion 24 coupled to the input circuit for producing a first voltage signal that varies in accordance with variations in load voltage; a second circuit portion 26 coupled to the input circuit for producing a pair of voltage signals having different magnitudes and which are substantially fixed relative to the first voltage signal; and voltage signal comparison means 28. The signal comparison means 28 includes output means 30 for actuating motor means 32 in a tap changing operation when the first voltage signal rises above or falls below the range of the relatively fixed voltage signals.

The input circuit 22 includes an integrating capacitor C1, coupled to the load line 15 by conductors 33 and a bridge type rectifier 34 consisting of diodes, D1, D2, D3 and D4. In addition, integrating and surge protecting resistors R1, R2 and R3 are conducted in conductors 33 between the load line 15 and the full wave rectifier 34.

The first circuit portion 24 includes the series combination of a Zener diode D5 and a resistor R4 which are connected across the input terminals 36 and 37 of the control circuit. Because the voltage drop across diode D5 will at all times be equal to its Zener voltage, the potential at junction point 39 between diode D5 and resistor R4 will be equal to the input voltage minus the Zener voltage of D5. Hence, because the Zener voltage of D5 remains constant it can be seen that the potential at junction point 39 will change through the same number of volts as the positive terminal 37, whose voltage in turn, is proportional to the voltage in load line 15.

The second circuit means 26 is also connected across input terminals 36 and 37 and comprises a resistor string consisting of resistors R5, R6, R7 and R8. It will be appreciated that the potentials at the junction points 40 and 42 between resistors R6 and R7 and between resistors R7 and R8 respectively, vary in direct proportion to changes in the applied voltage. In order to insure that these potentials are substantially constant within the operating range of the device, the combined resistance of R5 and R6 is much larger than that of R7 or R8 so that the voltage drop across R5 and R6 will be substantially the entire applied voltage. As a result, changes in the potential at junction points 40 and 42 will be only a small fraction of the total change in the applied voltage so that these potentials can be considered relatively fixed with respect to the potential at junction point 39, which changes directly with changes in the applied voltage. In this manner, a pair of voltage signals are produced at junction points 40 and 42 whose values are different from each other and which are substantially fixed with respect to the potential at junction point 39.

The signal comparison circuit 28 includes a first PNP type transistor T1 whose emitter is connected to junction point 40 and whose base is connected to junction point 39 and a second PNP transistor T2 whose emitter is connected to junction point 39 and whose base is connected to junction point 42. The emitter and collector of T1 are respectively connected to the anode and gate of a silicon controlled rectifier SCR1. Similarly, the emitter and collector of T2 are respectively connected to the anode and gate of a second silicon controlled rectifier SCR2.

Silicon controlled rectifiers SCR1 and SCR2 comprise the output portion 30. The anode and cathode of SCR1 is connected across the output terminals of a full wave rectifier 44 consisting of diodes D6, D7, D8 and D9. Similarly, the anode and cathode of SCR2 is connected across the output terminals of full wave rectifier 45 consisting of diodes D10, D11, D12 and D13. Rectifiers 44 and 45 form a part of the motor means 32.

Motor means 32 also includes a suitable reversible driving means such as shaded pole motor 46 having a main winding 47 connected to any suitable source of alternating current such as load line 15, a pair of series connected forward shading windings 48 and 49 and a pair of series connected reverse shading windings 50 and 51. The series connected forward shading windings 48 and 49 are connected to the output terminals of rectifier 44 and the series connected reverse shading windings 50 and 51 are connected to the output terminals of rectifier 45. Shaded pole motor 46 also includes a rotor 52 whose output shaft 53 is connected to tap changer 18 through a suitable gear reduction mechanism 54.

In operation, resistors R7 and R8 are so chosen that the potential at junction point 39 will be lower than the potential at junction point 40 and above the potential at junction point 42 when the voltage in the load line is within the desired range or band width. It can be seen, that under this condition of operation, the base potential of T1 will exceed its emitter potential so that it will be nonconductive. Similarly, the base potential of T2 also exceeds its emitter potential so that this transistor will also be nonconductive. Because neither of the transistors T1 or T2 are conductive, each of the pairs of shading windings 48–49 and 50–51 are open circuited so that the rotor 52 of the shaded pole motor 46 is at rest. This condition will prevail as long as the voltage in the load line 15 lies within the preselected band width.

If a large load is suddenly applied to line 15, the losses in transformer 10 and in the load line itself will cause the load voltage to suddenly drop a few volts, depending upon the size of the additional load. This reduction in load line 15 voltage causes a corresponding reduction in the voltage across capacitor C1 whereupon it will discharge slightly through the first and second circuit means 24 and 26 until the voltage across it again equals an integrated value proportional to the voltage and load line 15. Because the voltage drop across D5 will at all times be equal to its Zener voltage, the potential at junction point 39 will change through the same number of volts as the voltage at the output terminals of rectifier 34.

In addition, because the voltage drop across Zener diode D5 remains constant, even though the input voltage changes, the voltage drop between points 36 and 39 also remains constant, so that any change in the input voltage causes an equal change in the potential at junction point 39. If the reduction in load line voltage is sufficient to lower the potential at junction point 39 below the potential at junction point 42, the transistor T2 emitter potential will exceed its base potential and it will begin conducting collector current to the gate electrode of SCR2.

A silicon controlled rectifier is a three element circuit device having an anode, a cathode and a gate. Normally current does not flow from the anode to the cathode unless a trigger current is passed into the gate, in which case the device becomes a short circuit from anode to cathode.

As a result of the T2 collector current flowing to the gate of SCR2 the reverse shaded pole windings 50 and 51 are short circuited so that the rotor 52 will begin turning in a direction tending to move the tap changer 18 downwardly, thereby reducing the number of turns in the primary winding 12 of transformer 10. This, of course, raises the voltage in the secondary winding 14 of transformer 10 and, as a result, in load line 15. When the voltage in load line 15 reaches the point where the potential at junction point 39 raises above that of junction point 42, transistor T2 will cease conducting. Thus, with the gate current to SCR2 stopped, windings 50 and 51 will be open circuited and the motor 46 will stop.

If a portion of the load is removed from line 15, so that the secondary voltage in transformer 10 rises above a predetermined desired value, capacitor C1 will begin charging until the voltage at the input terminals 36 and 37 equals a new integral proportional to the voltage in load line 15. The potential at junction point 39 will also rise an equal number of volts. If the new potential on junction point 39 exceeds the potential at junction point 40 the transistor T1 emitter potential will exceed its base potential, and it will begin conducting. As a result, trigger current will flow to the gate of SCR1 which will then short circuit the forward shaded pole windings 48 and 49 of motor 46 to cause rotor 52 to begin turning in a forward direction. The tap changer 18 is thereby moved upwardly to increase the number of turns in the primary winding 12 of transformer 10 which, decreases the voltage in load line 15. As the taps are being changed in the transformer 10, the potential at junction point 39 will fall until it reaches a point below the potential at junction point 40. Upon this event, T1 will cease conducting and SCR1 will become non-conductive. This open circuits the shaded pole windings 48 and 49 and the rotor 52 of motor 46 will again come to rest.

Resistors R9 and R10 are inserted between the cathode and gate of SCR1 and SCR2 respectively to provide a path for leakage current from the anode to the gate, without going through the cathode. If leakage current is permitted to go directly from anode to cathode, it would act as gate current and would tend to turn the device on. The maximum operating temperature of the device is that temperature at which the leakage current through SCR1 or SCR2 plus the leakage current through its associated transistor T1 or T2, passing through R9 produces an IR drop sufficient to trigger one of the silicon controlled rectifiers. Since the leakage current in both of these devices is relatively small, it has been found that a maximum operating temperature of 90° C. can be readily achieved.

In prior art devices such as that shown in said copending application Serial No. 816,622 where the switching function of the full wave rectifiers is performed by transistors, a finely defined band width limit cannot be obtained because the impedance of a transistor is an inverse function of its base current. It will be appreciated that the magnitude of the base current to the output transistors of such prior art devices is an inverse function of the error signal. Thus, when the error signal is relatively large, indicating that the load voltage has deviated a large amount from within the theoretical band widths, the error signal will be high and accordingly the impedance in the shaded pole windings will be small. On the other hand, when there is a small deviation from the band width, producing a relatively small error signal, the current to the base of prior art output transistors will be relatively small so that a large impedance will be presented to the shaded pole windings of the tap changing motor.

Thus, with a relatively small base current, the impedance presented to the shaded pole current will be relatively high and as a result, less than full shaded pole current will flow. This results in a smaller output torque from the motor. If this torque is too small it may be insufficient to overcome the spring and contact pressure of the tap changer 18 so that a tap change will not take place. Thus, the band width edges of such prior art devices are defined not by that voltage change sufficient to short circuit the shaded pole windings, but by that which will provide sufficient motor torque to perform a tap change. With the use of silicon controlled rectifiers, however, the impedance presented to the shaded pole current will be constant regardless of the magnitude of the error signal.

While the invention has been described with reference to a voltage regulating transformer, it will be understood that it has application as well with other types of controlled voltage and current regulating apparatus such as capacitor switches which connect or disconnect capacitors to a system as power factor changes cause variation in the system voltage.

While only a single embodiment of the invention has been shown and described, other modifications thereof will become apparent to those skilled in the art. Accordingly, it is intended to cover in the appended claims all such modifications which fall within the scope of the invention.

I claim:

1. A device for controlling the voltage in an electrical system, having a transformer and a tap changer, said device including sensing means connected to said system for sensing the voltage therein, first circuit means connected to said sensing means for passing an electric current when said system voltage falls below a predetermined range of values, second circuit means connected to said sensing means for passing an electric current when said system voltage rises above said range of values, a first silicon controlled rectifier having its gate electrode connected to said first circuit means, a second silicon controlled rectifier having its gate electrode connected to said second circuit means, and reversible motor means having a pair of oppositely oriented windings for actuating said tap changer to restore said quantity to said range of values, the anode and cathode of each of said silicon controlled rectifiers normally open circuiting one of said windings.

2. A device for controlling the voltage in an electrical system, having a transformer and a tap changer, said device including sensing means connected to said system for sensing the voltage therein, first circuit means connected to said sensing means for passing an electric current when said system voltage falls below a predetermined range of values, second circuit means connected to said sensing means for passing an electric current when said system voltage rises above said range of values, a first silicon controlled rectifier having its gate electrode connected to said first circuit means, a second silicon controlled rectifier having its gate electrode connected to said second circuit means, and a reversible shaded pole motor for actuating said tap changer and having a pair of forward and a pair of reverse oriented shaded pole windings, a pair of full wave rectifiers each having input terminals in circuit with one of said pair of shaded pole windings, the anode and cathode of each of said silicon controlled rectifiers connected to the output terminals of one of said full wave rectifiers to normally open circuit said windings, and a resistance connected between the gate electrode and cathode of each of said silicon controlled rectifiers.

3. A control circuit for maintaining the voltage in a system within preselected limits, the combination of, circuit means coupled to said system for sensing changes in said voltage and for producing electrical signals which vary relative to each other as said system voltage varies relative to said limits, electrical signal comparison means including first and second transistor means, each of said transistor means including an emitter, a base and a collector, the emitter and base of each of said first and second transistor means being connected to said circuit means for receiving said electrical signals, said circuit means being constructed and arranged to change the conductive state of said first transistor means when said system voltage rises above said limits and to change the conductive state of said second transistor means when said system voltage falls below said limits, a first controlled rectifier having its gate electrode connected to the collector of said first transistor means, a second controlled rectifier having its gate electrode connected to the collector of said second transistor means, and reversible electromotive means having a first winding connected to the anode and cathode of said first controlled rectifier and operable to raise said system voltage when said first rectifier becomes conductive and second winding means connected to the anode and cathode of said second controlled rectifier and operative to lower said system voltage when said second controlled rectifier becomes conductive.

4. A circuit for controlling an electrical quantity in a system, first circuit means connected to said system for producing a first electrical signal which varies in accordance with variations in said electrical quantity, a second circuit means for producing a pair of electrical signals, said electrical quantity being within its normal limits when said first electrical signal has a predetermined value relative to said pair of electrical signals, electrical signal comparison means including first and second electronic circuit elements each having a control terminal and a pair of output terminals, each of said circuit elements being in a conductive state when the electrical signal applied to its control terminal has a predetermined relation to that applied to one of its output terminals and in a nonconductive state when the control terminal signal has a second predetermined relation to the output terminal signal, one of the output terminals and the control terminal of said first electronic circuit element being connected to said circuit means for receiving said first electrical signal and one of said pair of electrical signals, one of the output terminals and the control terminal of said second electronic circuit element being connected to said circuit means for receiving said first electrical signal and the other of said pair of electrical signals, said circuit means being constructed and arranged to change the conductive state of said first electronic circuit element when said quantity rises above said limits and to change the conductive state of said second electronic circuit element when said quantity falls below said limits, a first controlled rectifier having its gate electrode connected to the other output terminal of said first electronic circuit element, a second controlled rectifier having its gate electrode connected to the other output terminal of said second electronic circuit element, and reversible motive means connected to the anode and cathode of said first and second controlled rectifiers and operative to lower said quantity when said first controlled rectifier is conductive and to raise said quantity when said second rectifier is conductive.

References Cited by the Examiner

UNITED STATES PATENTS

| | | | |
|---|---|---|---|
| 2,913,657 | 11/59 | Erickson | 323—43.5 |
| 3,018,432 | 1/62 | Palmer | 323—66 |

LLOYD McCOLLUM, *Primary Examiner.*